No. 777,651. PATENTED DEC. 13, 1904.
T. CAHILL.
TYPE WRITING MACHINE OR OTHER SIMILAR INSTRUMENT.
APPLICATION FILED FEB. 28, 1901. RENEWED APR. 18, 1904.
NO MODEL. 6 SHEETS—SHEET 4.
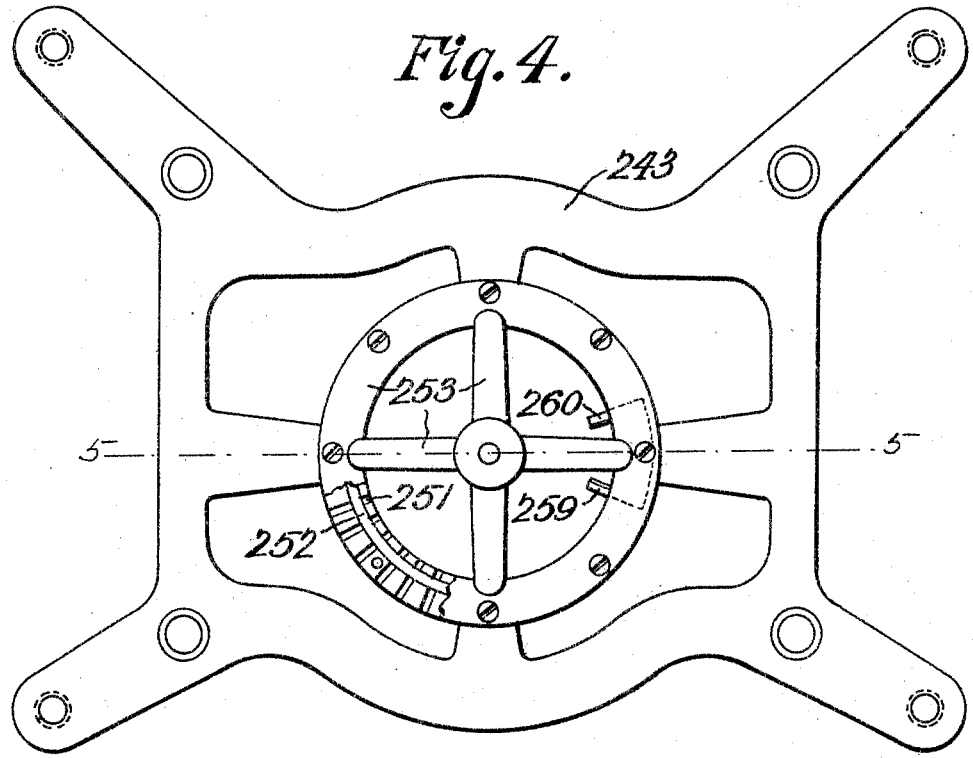
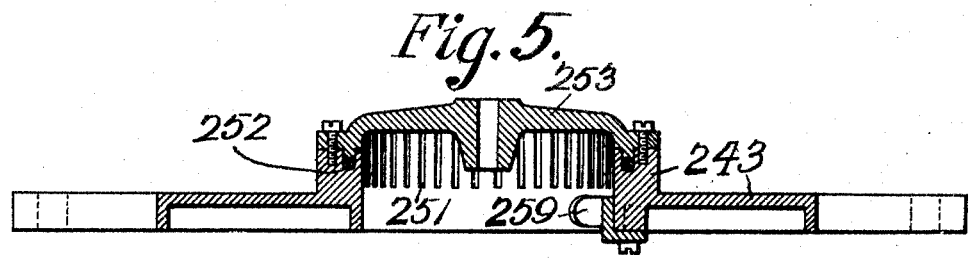
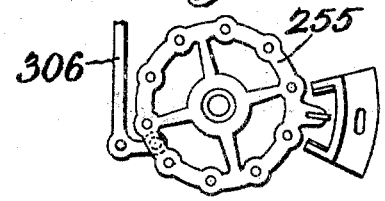
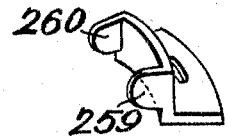
Attest
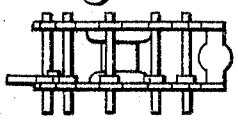
Inventor No. 777,651. PATENTED DEC. 13, 1904.
T. CAHILL.
TYPE WRITING MACHINE OR OTHER SIMILAR INSTRUMENT.
APPLICATION FILED FEB. 28, 1901. RENEWED APR. 18, 1904.
NO MODEL. 6 SHEETS—SHEET 5.

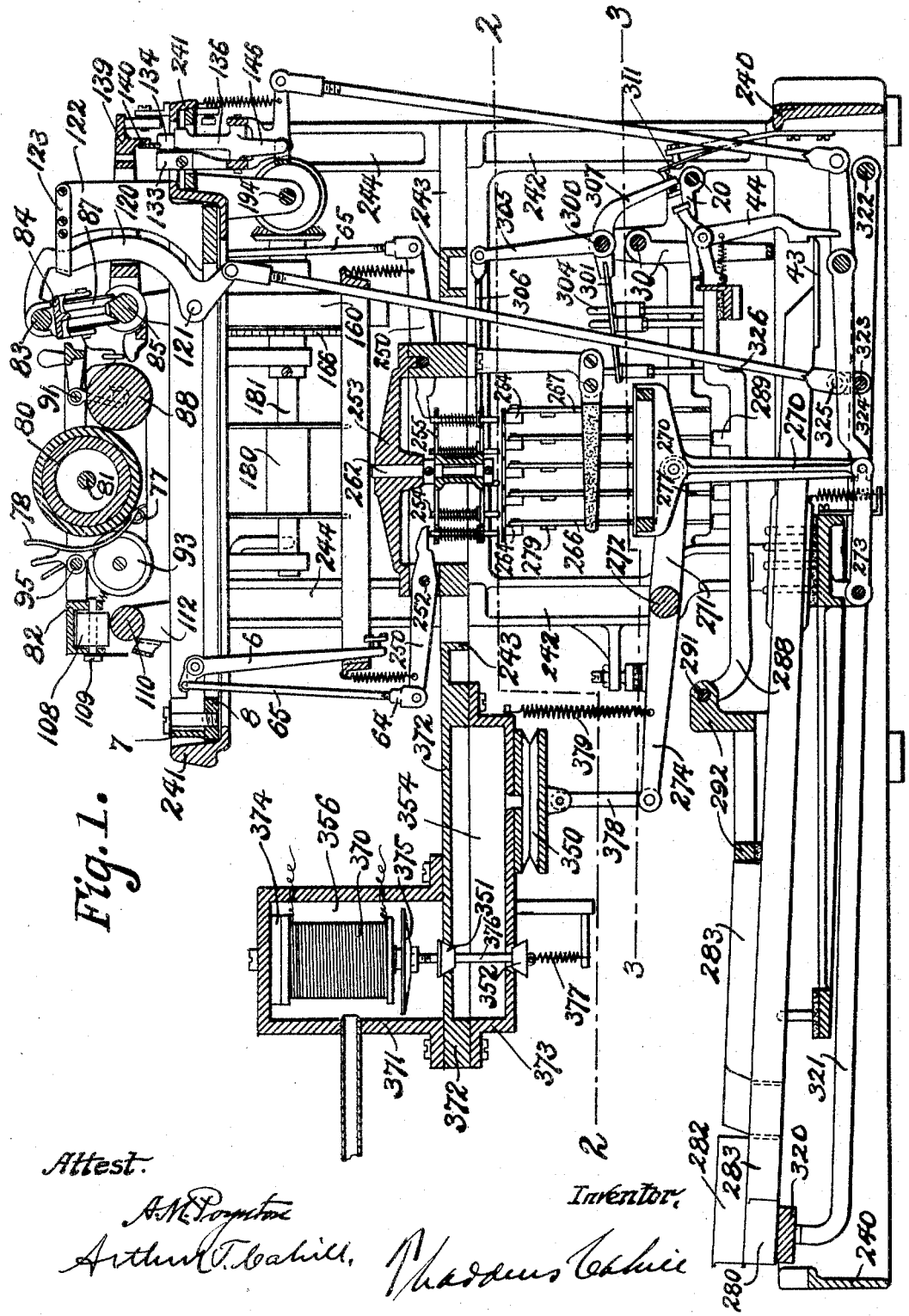

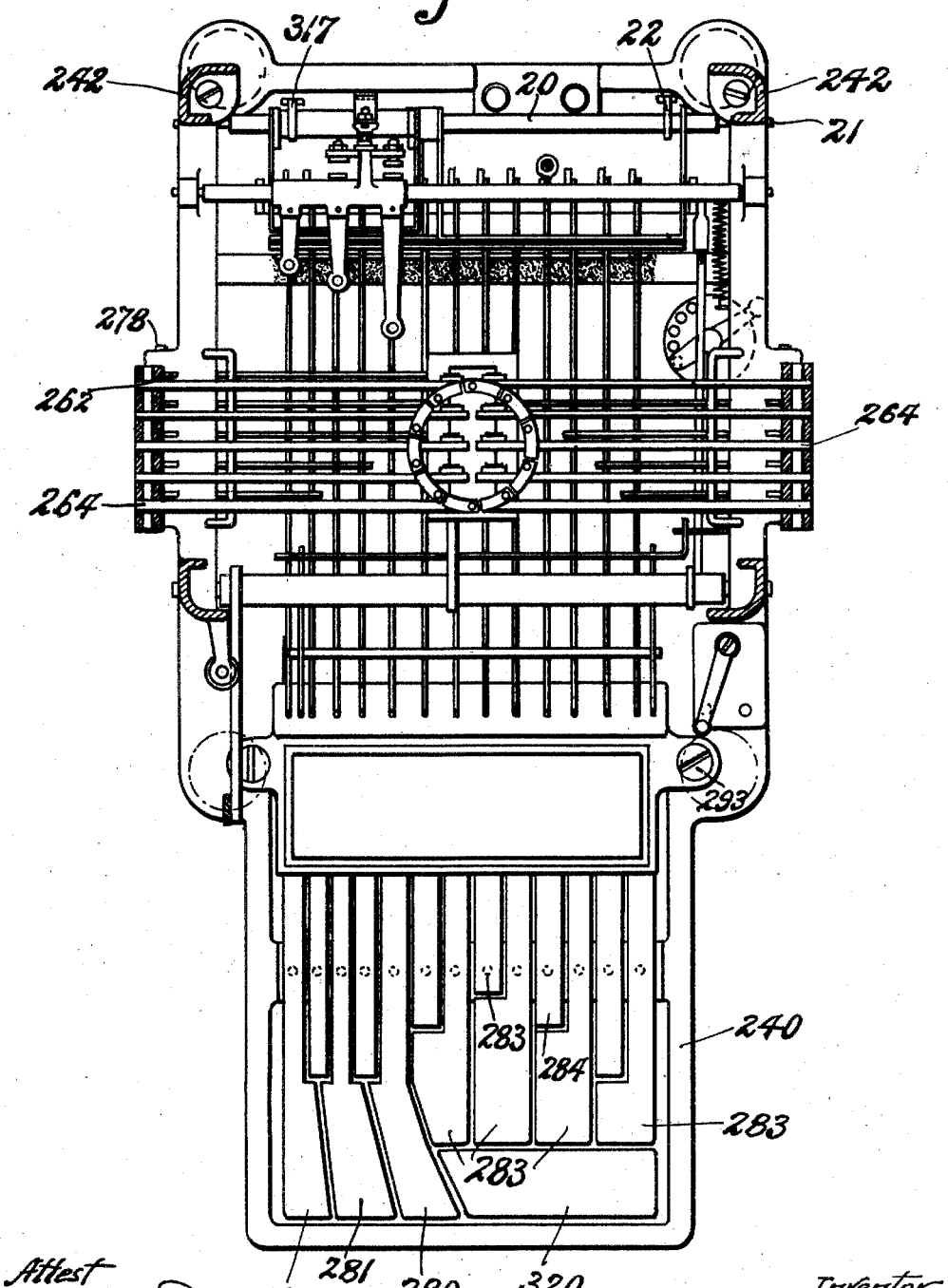

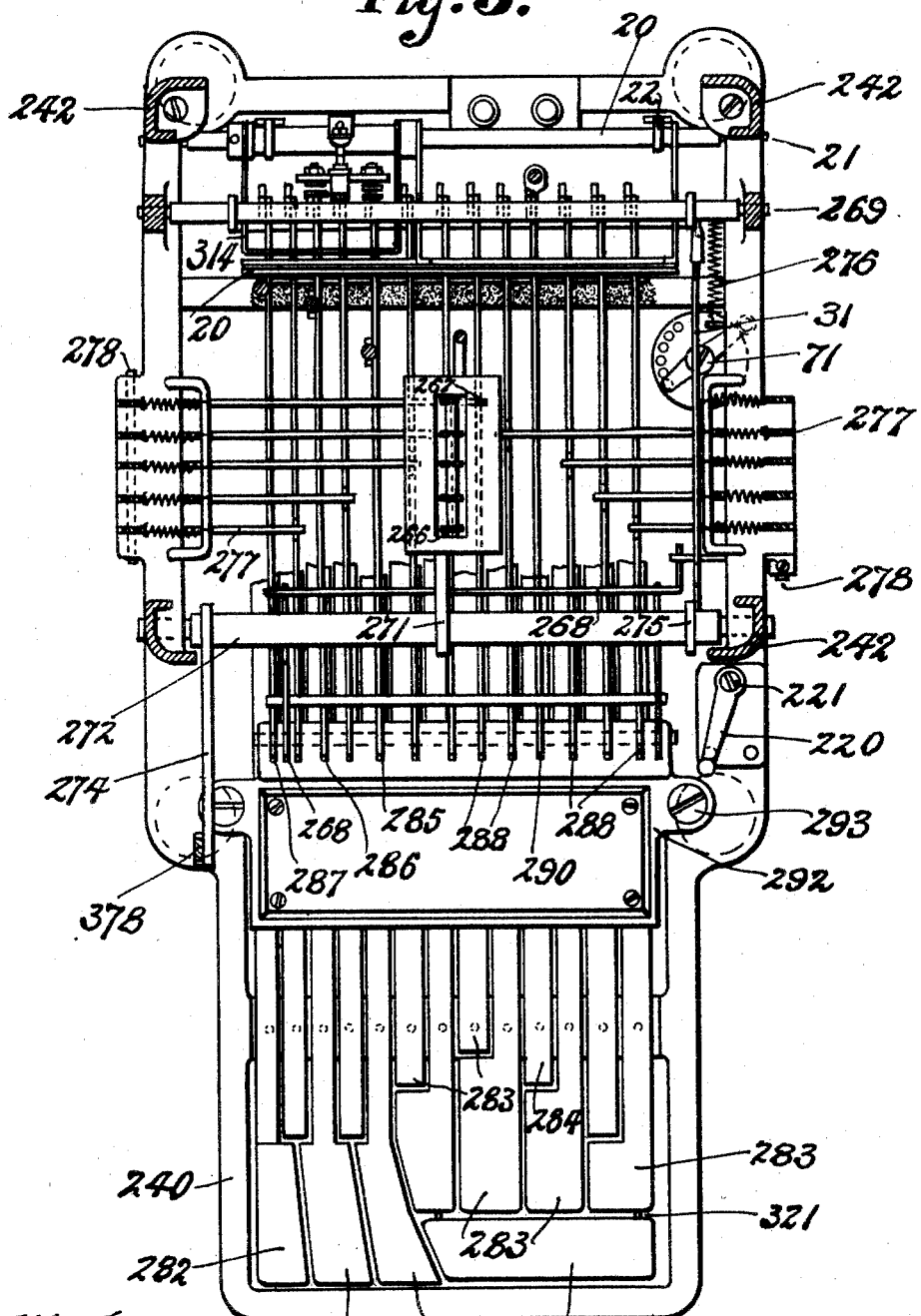

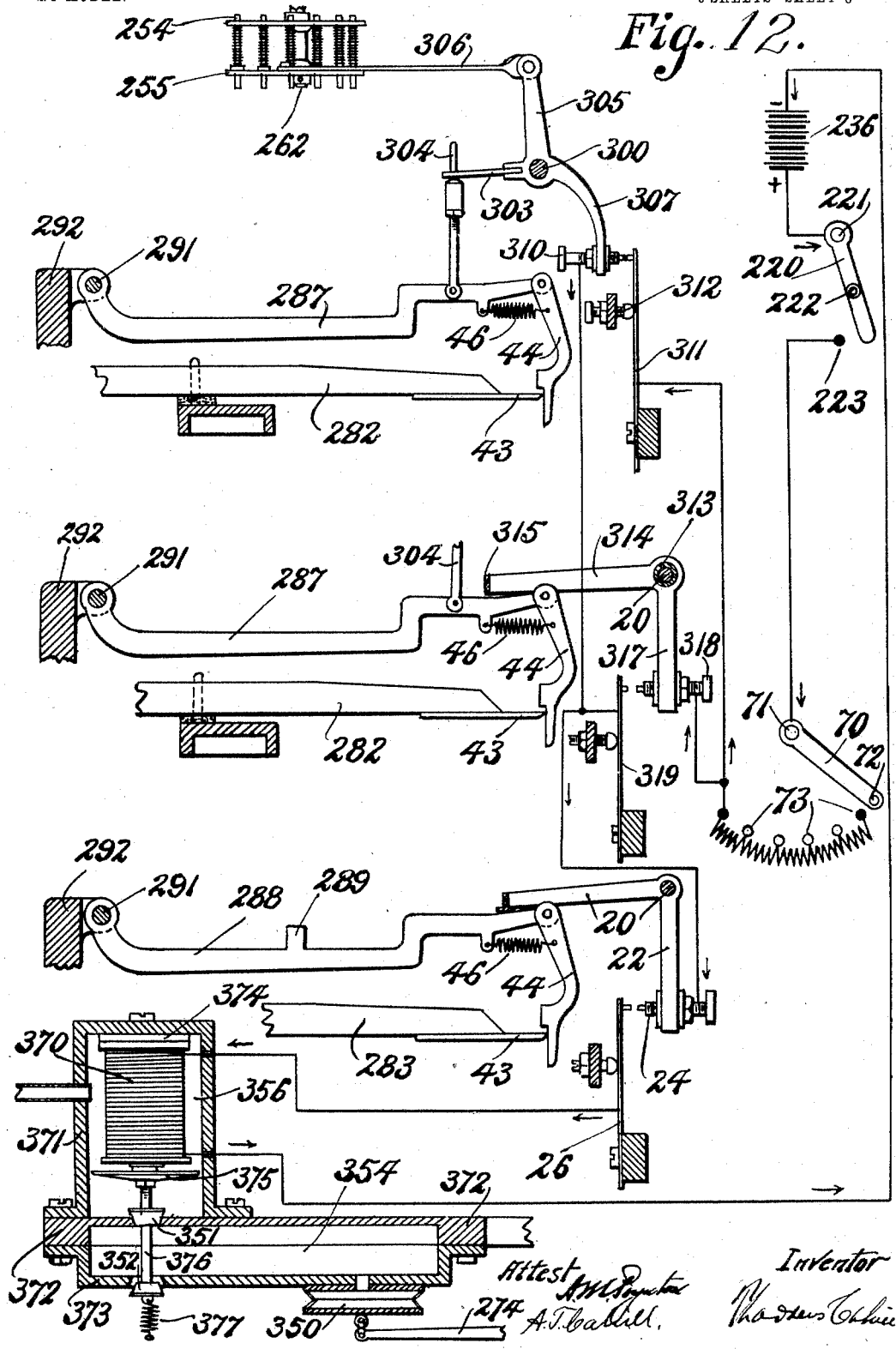

No. 777,651. Patented December 13, 1904.

UNITED STATES PATENT OFFICE.

THADDEUS CAHILL, OF NEW YORK, N. Y., ASSIGNOR TO ELLIS SPEAR, JOHN T. SCHAAFF, E. HILTON JACKSON, AND JOSEPH J. DARLINGTON, TRUSTEES.

TYPE-WRITING MACHINE OR OTHER SIMILAR INSTRUMENT.

SPECIFICATION forming part of Letters Patent No. 777,651, dated December 13, 1904.

Application filed February 28, 1901. Renewed April 13, 1904. Serial No. 203,806. (No model.)

*To all whom it may concern:*

Be it known that I, THADDEUS CAHILL, a citizen of the United States, and a resident of the city, county, and State of New York, temporarily residing at Washington, in the District of Columbia, have invented certain new and useful Improvements in Type-Writing Machines or other Similar Instruments, of which the following is a specification.

In Letters Patent of the United States No. 657,478, dated September 4, 1900, is illustrated a form of type-writing machine having a keyboard consisting of a few keys only arranged to be operated conveniently by the right hand of the operator, whereby the operator is enabled with one hand only and without looking at the keys at all to write rapidly and easily.

In another pending application of mine of even date herewith, Serial No. 49,266, is described another form of machine similar in general to that illustrated in Letters Patent above mentioned, but having certain important improvements in detail.

Both of the machines above mentioned are constructed to be operated by the power of the electric current.

The machine illustrated in the accompanying drawings is in general similar to that illustrated in the Letters Patent before mentioned, No. 657,478, dated September 4, 1900, and (except in respect of the nature of the motor mechanism) it is exactly similar to that illustrated in detail and fully described in my pending application before mentioned of even date; but the machine illustrated in the accompanying drawings differs from the machines illustrated in Letters Patent above mentioned and the pending application above mentioned in that it is constructed to be operated by pneumatic power. A brief description therefore will suffice.

Figure 9:
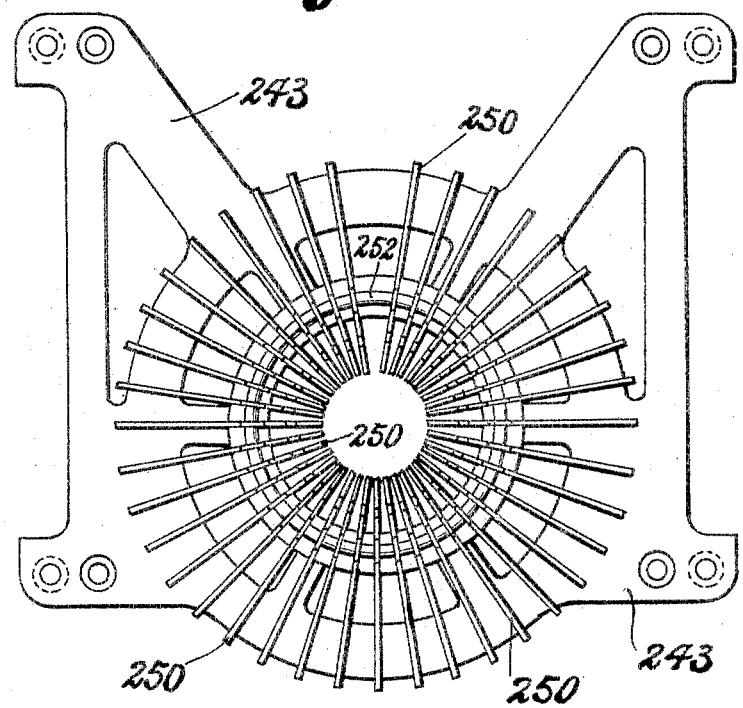
Figure 10:
Figure 11:
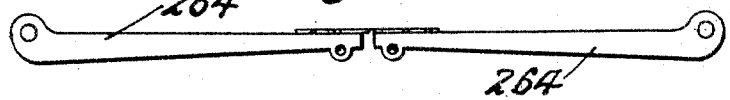

In the accompanying drawings, Figure 1 is a sectional view, partly in elevation, in a plane parallel with the length of one of the keys of the machine. Fig. 2 is a horizontal section on the line 2 2, Fig. 1. Fig. 3 is a horizontal section on the line 3 3, Fig. 1. Fig. 4 is a detail plan view of the center ring or fulcrum-ring with the cap-ring in place, a portion of said cap-ring being broken away to show the milled slots in fulcrum-ring and the annular wire upon which the radial levers are fulcrumed. Fig. 5 is a sectional view on the line 5 5, Fig. 4. Fig. 6 is a plan view of the pin-carrier with its link and returning-spring. Fig. 7 is an elevation of the same. Fig. 8 is a perspective view illustrating the stop by which the extreme movements of the shafting pin-carrier are limited. Fig. 9 is a plan view of the fulcrum-ring, showing the radial levers in position, the cap-ring being removed. Fig. 10 is a plan view of the group-controlling levers. Fig. 11 is a detail side elevation of the same. Fig. 12 is a diagrammatic view illustrating the arrangement of the electric circuit.

Similar reference-numerals refer to similar parts in all the drawings.

*Of the main frame.*—The main frame consists, essentially of (*a*) a bed-plate 240, (*b*) a top plate 241, (*c*) a center ring or fulcrum-ring 243, (*d*) side standards 242 242, bolted to the bed-plate and serving to support the fulcrum-ring 243, the group-controlling levers, the bell-crank levers, the motor-frame, the circuit-closing frame, the releasing-frame, the pin-carrier driving-frame, and various other parts hereinafter described, and (*e*) four columns 244 244 244 244, that rise from the fulcrum-ring 243 to support the top plate 241.

*Of the type-bars and the means for controlling them.*—6 6 are the type-bars, fulcrumed by means of hangers 7 7, screwed fast to the hanger-ring 8. 250 250 are the radial levers which are set in milled slots 251 251 in the fulcrum-ring 243 and are fulcrumed by means of a circular or segmental wire 252, held in place by means of a cap-ring 253, which has slots milled in it to correspond with the slots in the fulcrum-ring 243, to which it is attached by suitable screws. Each of the radial levers 250 250 corresponds to one of the type-bars 6 6 and is connected with the short arm of such type-bar by means of a connecting-nut 64 and link 65.

Underneath the inner ends of the radial levers 250 250 are the pins 254 254, (one pin to every four radial levers, as the machine illustrated in the drawings is constructed, though the number of radial levers in a group and controlled by a single pin may of course be altered, if desired,) mounted in the oscillating pin-carrier 255 and held in their normal positions (shown in Fig. 7) by light expansive springs 256 256, which bear upon collars 257 257, attached to the pins 254 254, pressing said collars down on the lower disk of the pin-carrier 255. Each of the pins 254 254 serves to give movement to the different radial levers of the group controlled by it to each radial lever as required, the pin-carrier 255 being oscillated to bring its pins into operative relation with the different radial levers which it controls, each as required.

Just below the pins 254 254 are the group-controlling levers 264 264, which are centered on the rods 265 265. Said rods are supported by the standards 242 242, said standards being milled to produce slots to receive the several group-controlling levers aforesaid. The proximate ends of the group-controlling levers 264 264 are made segmental, as illustrated in Figs. 2 and 10, so that however the pin-carrier may be oscillated or vibrated within the limits of its movement each of the pins 254 254 always lies over the corresponding group-controlling lever 264.

Movement-receiving arms 266 266 are pivoted to the group-controlling levers 264 264. An oscillating frame 270 underlies the said movement-receiving arms. Said frame is mounted by means of the arm 271 of the rock-shaft 272 and the bridle-lever 273, to both of which it is pin-jointed. To the other arm 274 of the rock-shaft 272 the pneumatic power device 350 is connected. Said power device serves when a key is depressed to give movement to the oscillating frame 270 aforesaid, and thereby to whatever one of the group-controlling levers 264 264 may have its movement-receiving arm 266 266 overlying said frame. A movement-receiving arm 267, hinged to one of the group-controlling levers 264, normally overlies the motor-frame 270, while all the other movement-receiving arms 266 266 lie normally out of the path of movement of said frame.

We have seen that each of the group-controlling levers 264 264, with the corresponding pin 254, controls a different group of the radial levers 250 and the type-bars 6 6. The question then of what type-bar shall be impelled when the oscillating frame 270 strikes up depends upon (*a*) what one of the group-controlling levers 264 264 has its movement-receiving arm in the path of movement of the motor-frame 270 and (*b*) what position the oscillating pin-carrier 255 occupies, whether its normal position or some one of the positions into which it is moved, respectively, by the depressing of the keys 280 281 282.

To control the nine movement-receiving arms 266 266 and the group-controlling levers 264 264, with which they are connected, there are nine keys 283 283, each of which serves, as we shall soon see, when depressed to swing the movement-receiving arm 266, connected with the group-controlling lever 264, that corresponds to such key, over the reciprocating frame 270 to receive movement therefrom; and the three keys 280 281 282 serve to oscillate or vibrate the pin-carrier 255 into the different positions required to connect each of the group-controlling levers 264 264 aforesaid with the different radial levers 250 250 of the group to which it corresponds.

*Of the keyboard.*—Let us now consider the arrangement of the keys and the parts which they actuate. As to the arrangement of the keys, see particularly Fig. 1. The keys 280 281 282, controlling the pin-carrier 255, are designed to be operated ordinarily and properly by the thumb, while the nine keys 283 283, corresponding to and controlling the different group-controlling levers 264 264, are designed to be regularly and properly operated by the fingers, excluding the thumb. The space-key 284 is designed to be operated by the ring-finger, which also operates one of the keys 283.

Overlying the keys 280 281 282 283 283 283 and the space-key 284 is a set of key-corresponding key-actuated levers (which for greater convenience and to distinguish them from the key-levers we shall sometimes hereinafter term "key-actuated" levers or "key-corresponding" levers) 285, 286, and 287, 288, 288, 288, and 290. These levers are fulcrumed in front by means of the rod 291, which is set in the support 292 292. Said support or arm is milled to receive the key-actuated levers aforesaid and also to receive the normal frame 268. It serves also as a stop to limit the upward movement of the keys, and it is attached by screws 293 293 to lugs 294 294, that rise from the bed-plate. To the rear end of each of the key-actuated levers 285, 286, 287, 288, 288, 288, and 290 is hinged a releasing arm or latch 44, which is held by a contractile spring 46 normally in contact with a steel extension 43, attached to the rear end of the corresponding key-lever. The latches 44 aforesaid serve each to connect the key-actuated lever to which it is pivoted to the corresponding key-lever, (280, 281, 282, 283, or 284,) so that when said key-lever is depressed in front by the operator it rises back of the fulcrum and lifts the corresponding key-actuated lever through the latch 44; but as the type-bar moves under the influence of the pneumatic power device 350 aforesaid toward the printing-point the releasing-frame 30 (which is centered at 269 and connected by a link 31 with the arm of the rock-shaft 272, Fig. 3,) strikes the latch 44, moving it off the extension 43, connected with the corresponding key-lever, and allowing all the parts to return to their normal positions immediately and before the operator has released the key-lever.

Bell-cranks 277 277, fulcrumed, by means of the rods 278 278, and set in milled slots in the standards 242 242 and having their horizontal arms overlying the key-actuated levers 288 288 288 (each of which is furnished with a projection 289, rising above it to act upon the corresponding bell-crank 277) and having their vertical arms connected by links 279 279 with the movement-receiving arms 266 266, serve to connect the key-actuated levers 288 288 288 with the movement-receiving arms 266 266, pivoted to the corresponding group-controlling levers 264 264, so that each of the keys 283 283 when depressed lifts, through the latch 44, the corresponding key-actuated lever 288, which serves (a) to swing, through its bell-crank 277 and link 279, the movement-receiving arm 266, connected with the corresponding group-controlling lever 264 over the oscillating motor-frame 270 to receive movement therefrom, (b) to lift the normal frame 268, which is centered upon the same rod 291, which serves as a fulcrum for the levers 285, 286, 287, 288, 288, 288, and 290 and which acts on one of the bell-cranks 277 aforesaid and through said bell-crank and the link 279, connected therewith, swings the normal movement-receiving arm 267 off from over the motor-frame 270, and (c) to lift the circuit-closing frame 20, centered at 21 and having an arm 22 carrying the battery-connected screw 24, furnished with a platinum point to make contact with a similar platinum point in the spring 26, (see Fig. 12,) thereby closing the circuit through the electromagnet 370, so that its core 374, becoming magnetized, attracts its armature 375, which thereupon gives movement to the valve-stem 376 to the valves 351 and 352, thereby bringing the pneumatic motor device 350 into action to operate the motor-frame 270, thus giving movement to whatever one of the movement-receiving arms 266 266 overlies it and to the group-controlling lever 264, to which said movement-receiving arm is pivoted, and to the pin 254, overlying said group-controlling lever. Said pin in turn gives movement to whatever one of the radial levers 250 250 it underlies, and the radial lever thus moved gives movement, through the link 65, to the corresponding type-bar 6, throwing the type carried thereby toward the printing-center, so that it prints.

As the type-bar approaches the printing-point the releasing-frame 30 (centered at 269, and connected by a link 31 with the arm 275 of the magnet-actuated rock-shaft 272) strikes the latch 44, moving it off of the end piece 43, attached to the corresponding key-lever, and thereupon the key-actuated lever returns to its normal position, releasing the various parts controlled by it and, among others, releasing the circuit-closing frame 20, which returning to its normal position breaks the circuit of the magnet aforesaid, whereupon the armature 375 returns to its normal position under the influence of the contractile returning-spring 377. The valves 351 352 return to their normal positions, permitting the wind to escape from the pneumatic 350, which, with the motor-frame 270, is returned to its normal position by the contractile returning-spring 379, releasing the movement-receiving arm 266, group-controlling lever 264, pin 254, radial lever 250, and type-bar 6, all of which immediately return to their normal positions, being assisted thereto by suitable springs, some of which are omitted from the drawings. The return of all of the parts to their normal positions takes place in a very small fraction of a second, and the operator cannot depress another key or keys to print another letter without having to wait to release the key or keys first depressed.

Each of the key-levers 283 283 283 (which from the fact that they are designed to be normally and regularly operated by the fingers of the hand as distinguished from the thumb we may properly term "finger-keys" or "finger-key levers") serves when depressed to cause some one of the type-bars of the group corresponding to it to be actuated by the motor-frame 270, and if no one of the keys 280 281 282 (which from the fact that they are designed to be normally and regularly depressed by the thumb we may call "thumb-keys" or "thumb-key levers") is at the same time depressed that one of the type-bars of the group is actuated whose radial lever 250 overlies the corresponding pin 254 when the pin-carrier 255 is in its normal position, with the stop 258 attached to it held in contact with the stop 259 of the support 260 by the contractile spring 261. The keys 280, 281, and 282 serve to oscillate the pin-carrier 255, and thereby to control what one of the type-bars of a group shall be actuated. For this purpose a pin-carrier driving-frame is used, consisting of (a) a rock-shaft 300; (b) three driving-arms 301 302 303, upon which the keys 280 281 282, respectively, act through the latches 44 44 44, levers 285, 286, and 287 and push-pieces 304 304; (c) a connecting-arm 305, connected by the link 306 with the pin-carrier 255, and (d) a stop-arm 307, carrying screws 308 308, (adjustable by means of lock-nuts,) which strike the stops 309 309, Fig. 2, attached to the rear ends of the key-actuated levers 285 286. Each of the pins 254 254, it will be observed, controls a group of four of the radial levers 250 250 and type-bars 6 6. Each pin, as before said, in all its different positions overlies the corresponding group-controlling lever 264. Each pin normally underlies the first radial lever 250 of the group of radial levers controlled by it, and it is oscillated to underlie the second, third, and fourth radial levers of its groups, respectively, by depressing the keys 280, 280, and 282, respectively.

When the connection between the thumb-key 280, 281, or 282 is depressed and the corresponding key-actuated lever 285, 286, or 287 is temporarily broken by the motor-impelled releasing-frame 30 acting upon the latch 44, corresponding to the key depressed, to free said latch, the pin-carrier 255 and the parts connected therewith are returned by the contractile spring 261 to their normal positions, with the stop 258, carried by the pin-carrier 255, resting against the stop 259 of the support 260.

The pin-carrier 255 is mounted upon an axle 262, set in the cap-ring 253, on which axle it is held by the collar 263 and a set-screw.

When one of the finger-keys is depressed simultaneously with one of the thumb-keys, it is important that the thumb-key which oscillates the pin-carrier 255 should throw said pin-carrier into the required position before the circuit of the valve-controlling magnet 370 is closed; for if the circuit of said magnet be closed before the pin-carrier has assumed the proper position a wrong letter is liable to be printed or other difficulties to result. To prevent, then, the premature closing of the circuit, means are provided which act in such manner that the circuit cannot be closed while a thumb-key is being depressed, or at least cannot be closed until the thumb-key which is being depressed approaches the limit of its depression. These means consist of (a) a contact-screw 310, carried by the arm 307 of the pin-carrier-driving rock-shaft 300, Fig. 12, and normally making contact with the contact-spring 311 (which is adjustable by the screw 312) when the pin-carrier occupies its normal position, but breaking contact with said spring 311 so soon as said pin-carrier moves from its normal position, and (b) a thumb-key-operated circuit-controlling frame having a sleeve 313 journaled on the shaft of the circuit-closing frame 20, with forward-extending arms 314 and a front part 315 overlying the thumb-key-operated levers 285, 286, and 287, so as to be operated by said levers, and having slots 316 316 cut into it overlying those of the levers 288 288, which, but for such slots, would operate said frame. Said frame has also a depending arm 317, carrying a contact-screw 318, insulated from said arm, adjustable by a lock-nut and having a platinum point, which when any of the keys 280 281 282 is depressed makes contact as such key approaches the limit of its depression with another platinum point in the contact-spring 319. The effect of this arrangement, it will be observed, is such that the circuit-closing frame 20 cannot complete the circuit while the pin-carrier is taking position, but completes the circuit if the pin-carrier is being positioned only after it has reached the proper position. Thus the difficulties which I have found would otherwise sometimes arise from closing the circuit before the pin-carrier had fully reached its position are entirely avoided.

Let us now follow the path of the current with reference to the diagrammatic view, Fig. 12. 236 is the battery or other source of electricity from which we may suppose the current flows to the pivot 221 of the switch 220 and thence, if the said switch be closed, to the contact-point 223, thence to the pivot 71 of the rheostat-arm 70, from which it flows to the different sections of the rheostat according to the position of the handle 72 and arm 70, whether said arm makes contact with one or another of the contact-points 73, and from said rheostat the current flows, if the pin-carrier 255 be in its normal position, to the spring 311 and thence to the contact-screw 310 in the arm 307, which normally makes contact with the said spring 311, and from said screw 310 the current flows to the contact-screw 24, carried by and insulated from the arm 22 of the circuit-closing frame 20, and from said screw 24 (if the circuit-closing frame 20 be oscillated from its normal position by the depressing of a key) to the contact-spring 26 and from said contact-spring 26 to and through the convolutions of the coil 15 of the valve-controlling magnet 370 and thence back to the negative pole of the battery 236; but if any of the thumb-keys be depressed the connection between the screw 310 and the contact-spring 311 is at once broken, so that the current instead of flowing by the path before described from the rheostat to the contact-screw 24 flows from said rheostat to the screw 318, carried by and insulated from the arm 317 of the thumb-key-operated circuit-controlling frame, and thence to the spring 319, with which the screw 318 makes connection as the thumb-key which is being depressed reaches the limit of its movement, and from said spring 319 to the contact-screw 24, carried by the circuit-closing frame 20, and thence to the contact-spring 26 and back through the coil 15 to the negative pole of the battery or other generator 236.

By means of the switch 220, it will be observed, the machine can be connected with or disconnected from the battery 236 or other source of current.

By means of the rheostat illustrated in Fig. 12 the resistance of the circuit can be varied not only to compensate for changes in voltage or in resistance, but also to adjust the rapidity of operation of the parts.

Having thus given a general description of the whole mechanism, let us examine more at length some of the details of construction of the motor mechanism.

The wind-chest 356 is formed by means of a hollow cylinder 371, screwed down upon the lug or horizontal extension 372 of the fulcrum-plate 243, while the valve-chest 354 is formed by a casting 373, circular in outline, which is screwed up against said extension 372 of the fulcrum-plate 243. The core 374 of the magnet 370 is screwed fast to the interior top wall of the cylinder 371, as illustrated in the drawings, while its armature 375 receives the screw-threaded end of the valve-stem 376, (made adjustable by means of a lock-nut,) on which the valve 351, covering the port between the wind-chest and valve-chest, and the valve 352, covering the port between the valve-chest and the external atmosphere, are set. In the normal condition of things gravitation and the force of the contractile returning-spring 377 hold the armature and valve-stem in such a position that the valve 351 closes its port while the valve 352 uncovers its port, the result of which of course is that the pneumatic 350, which is connected by the link 378 with the front extending arm 274 of the motor-frame, is held collapsed by the weight of said frame and the force of the contractile spring 379; but when by the action of the circuit-closing mechanism upon the depressing of the key, as hereinbefore described, (see particularly Fig. 12,) the circuit is closed the magnet 371, becoming energized, attracts its armature, thereby giving movement to the valves 351 352, opening the port between the wind-chest and the valve-chest, and closing the port between the valve-chest and the external atmosphere, so that the wind enters the pneumatic 350, expanding it and giving movement to the arm 274, rock-shaft 272, and motor-frame 270, thus giving movement to whatever one of the movement-receiving arms 266 or 267 overlies said frame and to the group-controlling lever 264, movement-transmitting pin 254, radial lever 250, link 65, and type-bar 6 and also to the releasing-frame 30 and the spacing mechanism, just as the magnet 370 does in the device illustrated in figure already described. When the releasing-frame thus actuated knocks the latch 44 off of the key extension 43, the key-corresponding lever operated by the key depressed with the circuit-controlling mechanism operated by said key through said key-corresponding lever returns to its normal position in advance of the release of the key, breaking the circuit of the magnet 370, whereupon its armature 375 with the valves 351 and 352 connected with it return under the influence of gravitation and of the contractile spring 377 to their normal positions, the valve 351 closing the port between the wind-chest and the valve-chest, while the valve 352 opens the port between the valve-chest and the external atmosphere. The pneumatic 350 collapses as the motor-frame 270 returns to its normal position, leaving the movement-receiving arm 266 or 267, group-controlling lever 264, pin 254, radial lever 250, and type-bar 6 free to return to their normal positions in advance of the release of the key, whereby another key may be depressed to print while the key first depressed is still held down.

320 is the shift-key, which is attached to the arms 321 321 of the shaft 322. A tie-rod 323 connects the arms 321 321 and has attached to it a lug 324, which is connected at 325 with one end of the link 326, whose other end is connected with the short arm of the shifting lever 120, so that said key when depressed shifts the short arm of the shifting lever 120, so that said key when depressed shifts the platen 80 from its lower-case to its upper-case position. A contractile spring 327 serves to hold the shift-lever 120 in its normal position and to return said shift-lever and platen to their normal positions when the shift-key 320 is released.

The carriage, the ribbon mechanism, the spacing mechanism, and other similar details of construction, as they form no part of my present invention, require no further description.

Instead of placing the pneumatic power device 350 in the position illustrated in the drawings it might be placed in some other convenient position—as, for example, in the bottom of the machine or in the table with which the machine is connected, so as to be out of view. In like manner the valve-controlling electromagnet 370, with the valves controlled by it, may be placed in any other suitable position—as, for example, in the base of the machine or to one side of it or in the table with which the machine may be connected.

Instead of using a power device of bellows form, as illustrated in the drawings, a cylinder and piston may be used instead.

The necessary wind may be supplied to the wind-chest 356 in any suitable manner.

The devices which I have figured in the drawings are shown in illustration of my invention; but numerous variations and modifications may be made without departing from certain essential features, combinations, or subcombinations set forth in the statement of claim at the end hereof.

I do not claim in this application anything that is claimed in any of my other pending applications, and in particular I do not claim in this application any part of the subject-matter of my other pending applications Serial No. 43,283, filed January 14, 1901, and Serial Nos. 49,265 and 49,266, filed February 28, 1901; but there are certain features of construction—for example, those involving the use of a device for preventing the motor from acting while the pin-carrier or its equivalent is being positioned or including the combination of such a device with the motor, the keys, the pin-carrier, or other parts—that are shown alike in this application and in the application before mentioned, Serial No. 49,266, and which are claimed in this application in combination with certain features or things—as, for example, the pneumatic motor—herein disclosed and that are not disclosed in the other application last mentioned, while the broader claims for subject-matter that is disclosed in said application Serial No. 49,266 (and important parts of which are also of necessity disclosed in this application) have been inserted in said application Serial No. 49,266, and which, being claimed in that application, are not claimed in this. Somewhat similar remarks apply to application Serial No. 49,265 in so far as the pneumatic motor device and the common vibratory frame combined with the keys and type-bars are concerned, the broader claims for which are inserted in Serial No. 49,265; but I wish full protection for the whole of my invention and for each and every part thereof, whether by means of this present application or by means of the applications before mentioned, Serial Nos. 49,265 and 49,266, and which are of even date with the original application, Serial No. 49,267, of which this application is a renewal and continuation.

What, therefore, I claim as of my own invention, and desire to secure by Letters Patent upon this present application, is—

1. In a type-writing machine and in combination, (a) type-bars; (b) a pneumatic motor device for operating said type-bars; (c) a valve, controlling said motor device; (d) an electromagnet, controlling said valve; and (e) one or more keys at the keyboard, controlling said electromagnet.

2. In combination in a type-writing machine, (a) type-bars striking to a common printing-center; (b) a pneumatic power device, common to a plurality of said type-bars for giving movement to said type-bars, each as required; (c) keys, fewer in number than said type-bars, and means operated by said keys, whereby said type-bars are connected, each as required, with the motor device aforesaid, to receive movement therefrom; and (d) valve mechanism, also controlled by said keys, whereby when a key is depressed and the appropriate type-bar connected with the pneumatic power device aforesaid, said power device is brought into action to operate said type-bar.

3. In combination in a type-writing machine, (a) type-bars striking to a common printing-center; (b) a pneumatic power device, common to a plurality of said type-bars for giving movement to said type-bars, each as required; (c) keys, fewer in number than said type-bars, and means operated by said keys, whereby said type-bars are connected, each as required, with the motor device aforesaid, to receive movement therefrom; (d) a valve, whereby said power device is brought into action to operate the type-bars; and (e) a key-controlled electromagnet for actuating said valve.

4. In combination in a type-writing machine, (a) type-bars striking to a common printing-center; (b) levers corresponding to said type-bars, and each connected with the type-bar to which it corresponds; (c) group-controlling devices, each serving to control a different group of the type-bar-corresponding levers and type-bars aforesaid; (d) pneumatic power mechanism for actuating said group-controlling devices, thereby to actuate the type-bars; and (e) keys at the keyboard, controlling said pneumatic power mechanism.

5. In combination in a type-writing machine, (a) type-bars striking to a common printing-center; (b) levers corresponding to said type-bars, and each connected with the type-bar to which it corresponds; (c) group-controlling devices, each serving to control a different group of the type-bar-corresponding levers and type-bars aforesaid; (d) pneumatic power mechanism for actuating said group-controlling devices, thereby to actuate the type-bars; (e) valve mechanism for controlling said pneumatic power mechanism; (f) electromagnetic means for actuating said valve mechanism; and (g) keys at the keyboard, controlling said electromagnetic means.

6. In combination in a type-writing machine, (a) type-bars striking to a common printing-center; (b) levers corresponding to said type-bars, and each connected with the type-bar to which it corresponds; (c) group-controlling devices, each serving to control a different group of the type-bar-corresponding levers and type-bars aforesaid; (d) pneumatic power mechanism for actuating said group-controlling devices, thereby to actuate the type-bars; (e) movement-transmitting devices intermediate said group-controlling devices and the groups of type-bar-corresponding levers operated respectively by said group-controlling devices; (f) a shifter, whereby said movement-transmitting devices are shifted as a set to bring each into operative relation with the different type-bar-corresponding levers of the group to which it corresponds, each type-bar-corresponding lever as required; (g) keys at the keyboard, controlling the pneumatic power mechanism aforesaid; and (h) one or more other keys at the keyboard, controlling the shifter aforesaid.

7. In combination in a type-writing machine, (a) type-bars striking to a common printing-center; (b) levers corresponding to said type-bars, and each connected with the type-bar to which it corresponds; (c) group-controlling devices, each serving to control a different group of the type-bar-corresponding levers and type-bars aforesaid; (d) pneumatic power mechanism for actuating said group-controlling devices, thereby to actuate the type-bars; (e) movement-transmitting devices intermediate said group-controlling devices and the groups of type-bar-corresponding levers operated respectively by said group-controlling devices; (f) a shifter, whereby said movement-transmitting devices are shifted as a set to bring each into operative relation with the different type-bar-corresponding levers of the group to which it corresponds, each typebar-corresponding lever as required; (g) keys at the keyboard, controlling the pneumatic power mechanism aforesaid; and (h) a device operated by said shifter-controlling key or keys, and acting to prevent the pneumatic power mechanism aforesaid from operating to impel a type-bar while the shifter aforesaid is being positioned.

8. In combination in a type-writing machine, (a) type-bars striking to a common printing-center; (b) levers corresponding to said type-bars, and each connected with the type-bar to which it corresponds; (c) group-controlling devices, each serving to control a different group of the type-bar-corresponding levers and type-bars aforesaid; (d) pneumatic power mechanism for actuating said group-controlling devices, thereby to actuate the type-bars; (e) movement-transmitting devices intermediate said group-controlling devices and the groups of type-bar-corresponding levers operated respectively by said group-controlling devices; (f) a shifter, whereby said movement-transmitting devices are shifted as a set to bring each into operative relation with the different type-bar-corresponding levers of the group to which it corresponds, each type-bar-corresponding lever as required; (g) valve mechanism for controlling the pneumatic power mechanism aforesaid; (h) electromagnetic means for actuating said valve mechanism; (i) keys at the keyboard controlling said electromagnetic means; and (k) one or more other keys at the keyboard, controlling the shifter aforesaid.

9. In combination in a type-writing machine, (a) type-bars striking to a common printing-center; (b) levers corresponding to said type-bars, and each connected with the type-bar to which it corresponds; (c) group-controlling devices, each serving to control a different group of the type-bar-corresponding levers and type-bars aforesaid; (d) pneumatic power mechanism for actuating said group-controlling devices, thereby to actuate the type-bars; (e) movement-transmitting devices intermediate said group-controlling devices and the groups of type-bar-corresponding levers operated respectively by said group-controlling devices; (f) a shifter, whereby said movement-transmitting devices are shifted as a set to bring each into operative relation with the different type-bar-corresponding levers of the group to which it corresponds, each type-bar-corresponding lever as required; (g) valve mechanism for controlling the pneumatic power mechanism aforesaid; (h) electromagnetic means for actuating said valve mechanism; (i) keys at the keyboard controlling said electromagnetic means; (k) one or more other keys at the keyboard, controlling the shifter aforesaid; and (l) a device operated by said shifter-controlling key or keys and acting to prevent the pneumatic power mechanism aforesaid from operating to impel a type-bar while the shifter aforesaid is being positioned.

10. In a type-writing machine, the combination with type-bars, striking to a common printing-center, keys fewer in number than said type-bars, and type-bar-selecting mechanism operated by said keys, of a pneumatic power device for actuating a plurality of said type-bars.

11. In a type-writing machine, the combination with type-bars, striking to a common printing-center, keys fewer in number than said type-bars, and type-bar-selecting mechanism operated by said keys, of a pneumatic power device for actuating a plurality of said type-bars; and a key-operated, electrically-controlled valve mechanism for said pneumatic power device.

12. In a type-writing machine, the combination with type-bars, striking to a common printing-center, keys fewer in number than said type-bars, and type-bar-selecting mechanism operated by said keys, of a pneumatic power device for actuating a plurality of said type-bars; and a key-operated, electrically-controlled valve mechanism for said pneumatic power device, for actuating a plurality of said levers; valve mechanism for controlling said pneumatic power device; an electromagnet for controlling said valve mechanism, and circuit-controlling means for said magnet; said circuit-controlling means being operated by a plurality of keys at the keyboard.

In testimony whereof I have hereunto set my hand, at Washington, in the District of Columbia, this 28th day of February, 1901, in the presence of the subscribing witnesses whose names are hereunto affixed.

THADDEUS CAHILL.

Witnesses:
H. L. BISSELLE,
W. M. SMITH.